(12) United States Patent
Ota et al.

(10) Patent No.: US 8,164,856 B2
(45) Date of Patent: Apr. 24, 2012

(54) MAGNETIC TAPE APPARATUS

(75) Inventors: Hiroyuki Ota, Ibaraki (JP); Yukihiro Hata, Ibaraki (JP); Junichiro Saikai, Ibaraki (JP); Sadamu Kuse, Ibaraki (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 821 days.

(21) Appl. No.: 12/279,169

(22) PCT Filed: Feb. 9, 2007

(86) PCT No.: PCT/JP2007/052367
§ 371 (c)(1),
(2), (4) Date: Oct. 22, 2008

(87) PCT Pub. No.: WO2007/094257
PCT Pub. Date: Aug. 23, 2007

(65) Prior Publication Data
US 2009/0040656 A1     Feb. 12, 2009

(30) Foreign Application Priority Data

Feb. 13, 2006 (JP) .................................. 2006-034624

(51) Int. Cl.
*G11B 15/60* (2006.01)
(52) U.S. Cl. ............ 360/130.21; 360/130.3; 360/130.32
(58) Field of Classification Search ............. 360/130.21, 360/72.2, 95, 130.3, 130.32
See application file for complete search history.

(56) References Cited

U.S. PATENT DOCUMENTS

| 5,508,865 | A | 4/1996 | La Garcia et al. |
| 5,847,906 | A | 12/1998 | Saito et al. |
| 5,872,692 | A | 2/1999 | Saito et al. |
| 5,982,592 | A | 11/1999 | Saito et al. |
| 2003/0029952 | A1 | 2/2003 | Poorman |

(Continued)

FOREIGN PATENT DOCUMENTS

EP 0 767 459 A1 4/1997

(Continued)

OTHER PUBLICATIONS

Japanese Office Action mailed on Mar. 1, 2011 for Japanese Patent Application No. 2008-500477 with its English translation.

*Primary Examiner* — Huan Hoang
(74) *Attorney, Agent, or Firm* — Birch, Stewart, Kolasch & Birch, LLP (57) ABSTRACT

A magnetic tape apparatus includes a feeding unit for feeding a magnetic tape; a take-up unit for taking up the magnetic tape, a magnetic head disposed the downstream of the feeding unit and the upstream of the winding unit, in a traveling path of the magnetic tape from the feeding unit to the take-up unit, and having the moving magnetic tape abut to the magnetic head; a fixed guide unit disposed adjacent to the magnetic head at least in the upstream on downstream of the traveling direction of the magnetic tape traveling on the traveling path toward the magnetic head and guiding the magnetic tape to the traveling path by abutting to the magnetic tape; and a controlling unit disposed on the fixed guide unit for controlling the movement of the magnetic tape in the tape width direction. On a contact surface which abuts on the magnetic tape in the fixed guide unit, there is provided a space for excluding the air lying between the moving magnetic tape and the contact surface.

10 Claims, 4 Drawing Sheets

U.S. PATENT DOCUMENTS

| | | |
|---|---|---|
| 2003/0087738 A1 | 5/2003 | Poorman |
| 2003/0231421 A1* | 12/2003 | Tateishi ................ 360/72.2 |
| 2004/0228034 A1 | 11/2004 | Nakao et al. |
| 2006/0152846 A1* | 7/2006 | Tsutsui .................... 360/95 |

FOREIGN PATENT DOCUMENTS

| | | |
|---|---|---|
| EP | 1 286 347 A1 | 2/2003 |
| JP | 1-302563 A | 12/1989 |
| JP | 4-167257 A | 6/1992 |
| JP | 5-19906 A | 1/1993 |
| JP | 7-65455 A | 3/1995 |
| JP | 7-73549 A | 3/1995 |
| JP | 7-226053 A | 8/1995 |
| JP | 9-97465 A | 4/1997 |
| JP | 9-237448 A | 9/1997 |
| JP | 2729031 B2 | 12/1997 |
| JP | 2003-59141 A | 2/2003 |
| JP | 2004-342211 A | 12/2004 |
| JP | 2005-92938 A | 4/2005 |
| JP | 2005-93020 A | 4/2005 |
| JP | 2005-93021 A | 4/2005 |

* cited by examiner

MAGNETIC TAPE APPARATUS

TECHNICAL FIELD

The present invention relates to a magnetic tape apparatus, more specifically, a magnetic tape apparatus equipped with a fixed guide unit having a regulating unit for regulating the running of a magnetic tape in the width direction thereof, and a magnetic head.

BACKGROUND ART

About magnetic tapes that have been used for data storage for computers in recent years, the recording density thereof has been improved to increase the recording capacity. For this purpose, in a magnetic tape having a data track in the longitudinal direction, the track width of the data track, in which data are to be recorded, becomes very narrow. For example, a recording format that the track width is 20 µm or less is suggested. When the data track width becomes narrow in such a way, it is very difficult to match the position of the data track on the magnetic tape and that of a signal reading element of a magnetic head with each other; thus, the following manner is adopted: a servo signal, which will be a positional benchmark, is written beforehand on a magnetic tape; swing of the tape in the width direction is detected by reading out the servo signal when the magnetic tape runs on a magnetic tape drive; in accordance with the swing, the magnetic head unit of the drive is moved in the width direction of the tape by means of an actuator, thereby attaining feedback control; thus, the signal reading element of the magnetic head is caused not to get out of the data track even if the width of the track is narrow.

Since the servo signal written in the magnetic tape is at a position for a benchmark for recording of data signals onto the magnetic tape and reproducing of them, it is necessary to record the servo signal precisely onto the magnetic tape in the producing process thereof. For this purpose, in the producing process of the magnetic tape, a fixed guide having a regulating unit for regulating the magnetic tape in the width direction is arranged adjacent to the magnetic head. The magnetic head is fixed in this way so as to be hardly swung in the width direction. This magnetic head is used to write the serve signal. A servo writer exclusive for the writing is used. The magnetic tape on which the servo signal is written in this way is stored into a cartridge case to produce a magnetic tape cartridge for computers.

However, generally-used magnetic tape drives do not have any running system the precision of which is equivalent to that of servo writers from the viewpoint of costs and the durability of magnetic tapes against repeated use thereof. Even if a servo signal is precisely written on a magnetic tape, the magnetic tape is swung in the width direction thereof when the tape runs in a drive, so that servo control cannot follow the movement of the tape. As a result, errors of reading out data may be generated.

A specific example of the servo writer is described in Patent Document 1 (JP-A-2005-92938), and a specific example of the magnetic tape drive is described in Patent Document 2 (Japanese Patent No. 2729031).

DISCLOSURE OF THE INVENTION

Problems to be Solved by the Invention

However, in conventional magnetic tape apparatuses, typical examples of which include a servo writer or magnetic tape drive of such a type as described above, the precision of a servo track when a servo signal is written is insufficient for a magnetic tape having a data track width of 20 µm. Also, insufficient therefor is the stability of tape-running at the time of reproducing, from the tape in which data signals are recorded, the signals.

An object of the invention is to solve such drawbacks in the prior art, and provide a magnetic tape apparatus wherein the running of a magnetic tape is very stable, such as a servo writer capable of writing precise servo signals, which have a constant distance from a benchmark edge, and a magnetic tape drive wherein reading errors due to deviation from a track are not generated.

Another object of the invention is to provide a magnetic-tape-producing process in which a servo signal is written by means of a servo writer capable of writing precise servo signals.

Means for Solving Problems

The inventors have made eager investigations about a magnetic tape apparatus having a feeding unit for feeding a magnetic tape, a winding unit for winding up the magnetic tape, a magnetic head arranged on the downstream side of the feeding unit and on the upstream side of the winding unit in a running path from the feeding unit to the winding unit, the magnetic tape contacting the magnetic head when the tape runs, a fixed guide unit arranged on at least one of the upstream side and the downstream side of the magnetic head in the running direction of the magnetic tape running on the running path so as to be adjacent to the magnetic head, and contacting the magnetic tape to guide the magnetic tape into the running path, and a regulating unit for regulating the running of the magnetic tape in the width direction of the tape, the regulating unit being fitted to the fixed guide unit, so that by making this magnetic tape apparatus into the following structure, a magnetic tape apparatus wherein the magnetic tape runs very stably can be obtained. Thus, the present invention has been made.

Accordingly, the magnetic tape apparatus of the invention is characterized in that a contacting face of the fixed guide unit, which contacts the magnetic tape, is equipped with an air passage which is a space for excluding entrained air lying between the running magnetic tape and the contacting face.

In the magnetic tape apparatus of the invention, it is allowable that the air passage is disposed along the contacting face, and the air entrained by the magnetic tape is excluded through the air passage.

In the magnetic tape apparatus of the invention, it is allowable that the air passage of the fixed guide unit is in the form of a groove.

In the magnetic tape apparatus of the invention, it is allowable that the air passage is disposed to penetrate from the contacting face of the fixed guide unit through the inside of the fixed guide unit, and the air entrained by the magnetic tape is excluded through the air passage.

In the magnetic tape apparatus of the invention, it is allowable that the fixed guide unit is arranged on each of the upstream side and the downstream side of the magnetic head in the running direction of the magnetic tape.

In the magnetic tape apparatus of the invention, it is preferable that on the running path of the magnetic tape, the distance between the downstream side end of the regulating unit fitted to the fixed guide unit on the upstream side of the magnetic head and the upstream side end of the regulating unit fitted to the fixed guide unit on the downstream side of the magnetic head is 25 mm or less.

In the magnetic tape apparatus of the invention, it is preferable that the length of the regulating unit(s) in the magnetic tape running direction is 3 mm or more and 10 mm or less.

In the magnetic tape apparatus of the invention, the material of the regulating unit(s) may be a ceramic.

The magnetic tape apparatus of the invention may be a servo writer.

Furthermore, the invention provides a process for producing a magnetic tape characterized in that a servo signal is written by means of a servo writer which is the magnetic tape apparatus.

Advantageous Effects of the Invention

According to the invention, in a magnetic tape apparatus having a feeding unit for feeding a magnetic tape, a winding unit for winding up the magnetic tape, a magnetic head arranged on the downstream side of the feeding unit and on the upstream side of the winding unit in a running path from the feeding unit to the winding unit, the magnetic tape contacting the magnetic head when the tape runs, a fixed guide unit arranged on at least one of the upstream side and the downstream side of the magnetic head in the running direction of the magnetic tape running on the running path so as to be adjacent to the magnetic head, and contacting the magnetic tape to guide the magnetic into running path, and a regulating unit for regulating the running of the magnetic tape in the width direction of the tape, the regulating unit being fitted to the fixed guide unit, a contacting face of the fixed guide unit, which contacts the magnetic tape, is equipped with an air passage which is a space for excluding entrained air lying between the running magnetic tape and the contacting face, whereby the air layer entrained by the running magnetic tape is released through the air passage so as to generate a negative pressure so that the magnetic tape is adsorbed onto the fixed guide unit. As a result, the magnetic tape does not float over the fixed guide unit, so that the tape does not swing in the width direction thereof.

When the air entrained by the magnetic tape is excluded through the air passage disposed along the contacting face or disposed to penetrate through the inside of the fixed guide unit, the swing of the tape in the width direction thereof can be more stably decreased.

When the air passage of the fixed guide unit is in the form of a groove, the step of producing the fixed guide unit becomes simple so that the production costs become low.

When the fixed guide unit is arranged on each of the upstream side and the downstream side of the magnetic head in the running direction of the magnetic tape, the swing of the tape in the width direction thereof can be more stably decreased in spite of the running direction of the magnetic tape.

When the distance between the downstream side end of the regulating unit fitted to the fixed guide unit on the upstream side of the magnetic head to regulate the magnetic tape and the upstream side end of the regulating unit fitted to the fixed guide unit on the downstream side of the magnetic head to regulate the magnetic tape is made as short as 25 mm or less, the movement of the magnetic tape on the magnetic head can be regulated in the width direction thereof with a higher certainty. Additionally, when the length of the regulating unit(s), for regulating the magnetic tape, in the magnetic tape running direction is set to 3 mm or more and 10 mm or less or the material of the regulating unit(s) is rendered a ceramic, the edge of the magnetic tape can be less damaged and further the regulating unit(s) can be less abraded.

When a magnetic tape apparatus as described above is a servo writer, a precise servo signal can be written onto a magnetic tape. Thus, in the case of writing a servo signal on a magnetic tape by means of the servo writer when the tape is produced, the produced magnetic tape can be rendered a magnetic tape wherein reading errors due to deviation from a track are not generated.

| DESCRIPTION OF REFERENCE NUMBERS OR SYMBOLS | |
|---|---|
| 10 | Magnetic tape apparatus (Servo writer) |
| 11 | Feeding unit |
| 12 | Winding unit |
| 13 | Magnetic head |
| 14 | Fixed guide units |
| 14a | Air passages |
| 14b | Flanges (Regulating units) |
| 14c | Contacting faces |
| 15 | Fitting unit |
| MT | Magnetic tape |
| t | Contacting regions |
| nt | Noncontacting region |

BEST MODE FOR CARRYING OUT THE INVENTION

The following will describe embodiments of the invention, referring appropriately to the drawings.

Figure 1:
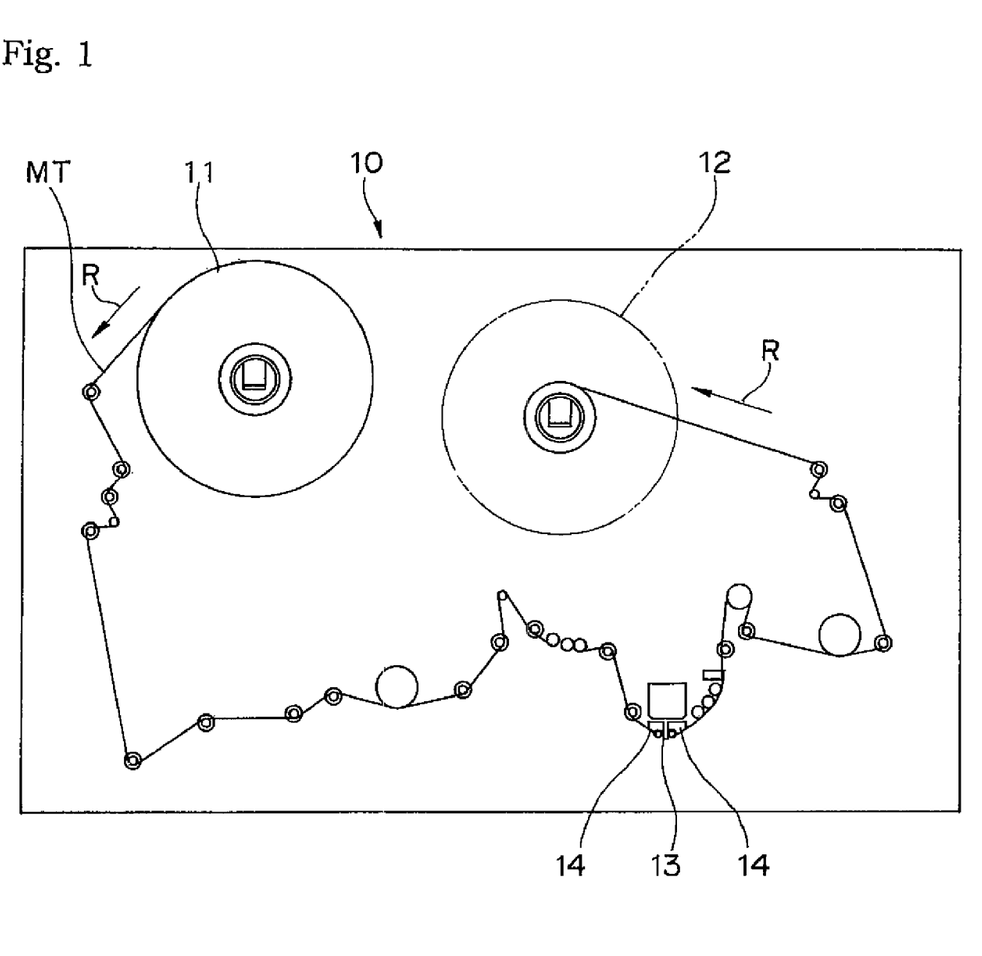
FIG. 1 is a structural view of a magnetic tape apparatus according to an embodiment of an example of the invention.

FIG. 1 is a structural view of a servo writer 10 which is an example of a magnetic tape apparatus of an embodiment of the invention. As illustrated in FIG. 1, the servo writer or magnetic tape apparatus 10 is equipped with a feeding unit 11 for feeding out a magnetic tape MT, and a winding unit 12 for winding up the magnetic tape MT from the feeding unit 11. A magnetic head 13 for writing, for example, a downwardly-flared (of a shape as a Japanese letter "ハ") servo signal is arranged on the downstream side of the feeding unit 11 and on the upstream side of the winding unit 12 along a running direction R of the magnetic tape MT. A guide block (fixed guide unit) 14, which is equipped with a pair of flanges for regulating the running of the magnetic tape MT in the tape width direction to position the magnetic tape rightly, is arranged on each of the upstream side and the downstream side of the magnetic head 13.

Figure 5:
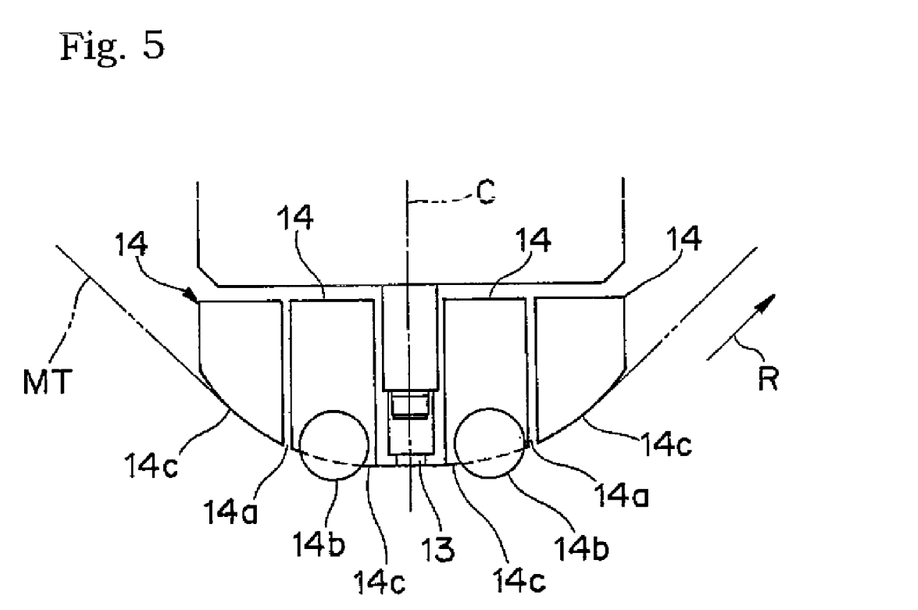
FIG. 5 is an enlarged side view of a main region according to an embodiment of another example of the invention.

The "guide" in the magnetic tape apparatus is a member for fulfilling a role for guiding the magnetic tape on the running path on which the magnetic tape runs from the feeding unit to the winding unit. The fixed guide means a guide which does not rotate or move itself. The fixed guide unit may be made of a single fixed guide (see FIG. 2) or plural fixed guides (see FIG. 5).

Figure 2:
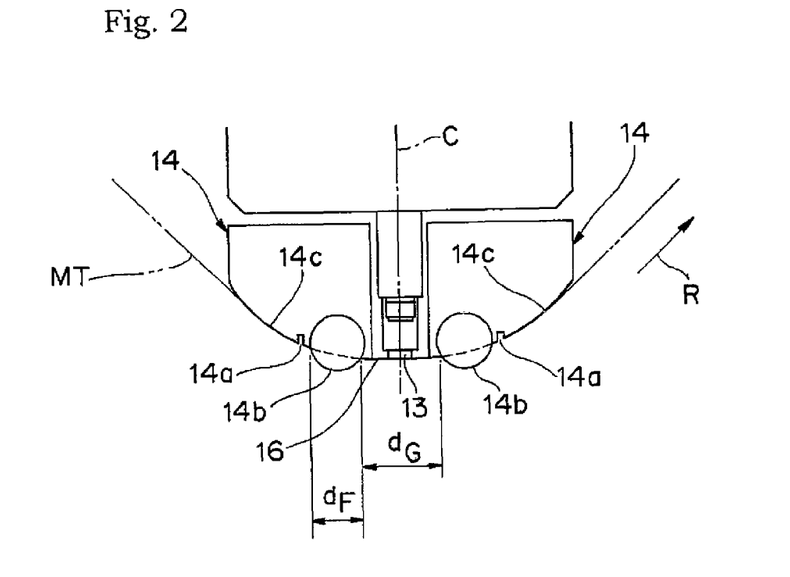
FIG. 2 is an enlarged top view of a main region according to the embodiment of the example of the invention.
Figures 3A, 3B:
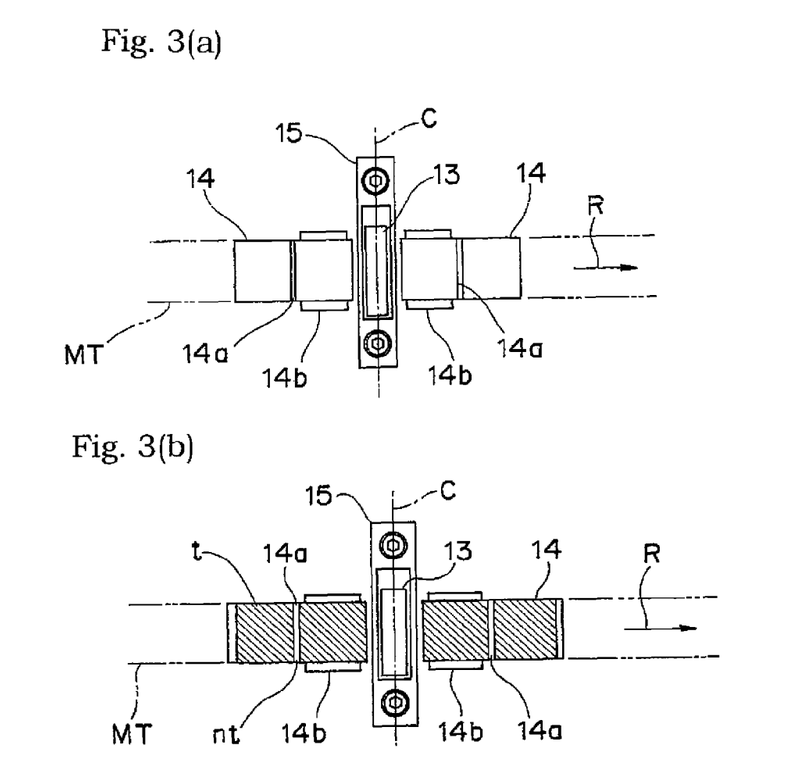
FIGS. 3(a) and 3(b) are enlarged front views of the main region according to the embodiment of the example of the invention.
Figure 4:
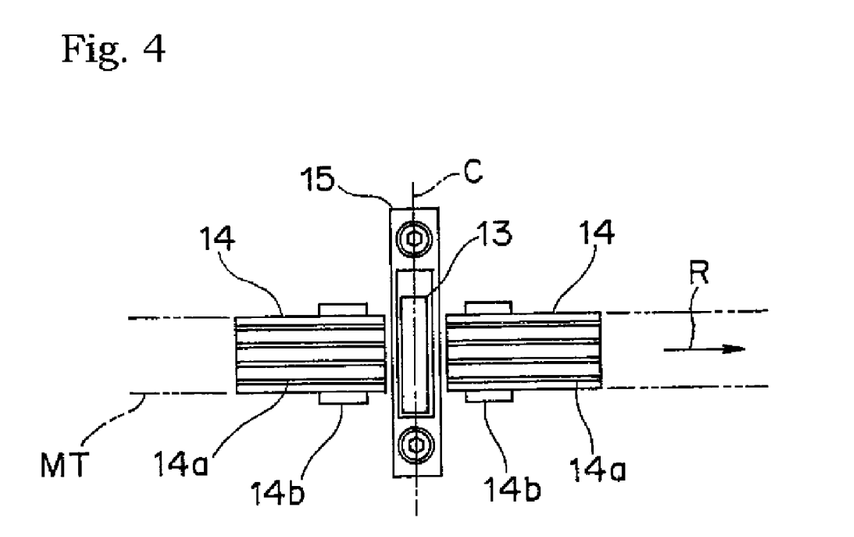
FIG. 4 is an enlarged front view of a main region according to an embodiment of another example of the invention.

FIGS. 2 to 4 are an enlarged top view and enlarged front views illustrating a main region of the servo writer 10. As illustrated in FIG. 2, each of the guide blocks 14 in the present apparatus has a contacting surface 14c, which is a surface contacting the magnetic tape MT, and further has, at an appropriate position of the contacting face 14c, an air passage 14a in a groove form for excluding air entrained by the magnetic tape along the contacting face 14c. In this way, an air layer entrained by the running magnetic tape MT is discharged through the air passage 14a. Thus, a negative pressure is generated in a region where the guide block 14 and the magnetic tape MT contact each other so that the magnetic tape MT is adsorbed onto the guide block 14. As a result thereof, the magnetic tape MT does not float over the guide block 14 so that the swing of the magnetic tape MT is not generated in the tape width direction. About the groove which constitutes this air passage 14a, the direction thereof (such as a longitudinal, transverse, oblique, or spiral form), the shape, the width, the depth, and the number thereof are appropriately decided in accordance with the running speed, the rigidity and the surface roughness of the magnetic tape MT, and others.

FIGS. 3(a), 3(b) and 4 illustrate an example wherein the air passages 14a are disposed along the width direction of the magnetic tape MT, and an example wherein the air passages 14a are disposed along the longitudinal direction or the running direction R of the magnetic tape MT, respectively. In FIG. 3(b), hatched regions t represent regions where the contacting face 14c and the magnetic tape MT contact each other when the magnetic tape MT runs as illustrated in FIG. 2. Symbol nt represents a non-contacting region corresponding to one of the air passages 14a. When the air passages 14a are in the form of grooves, the guide blocks 14 are easily produced. Thus, the production costs are low, and further the air entrained by the running magnetic tape MT is more easily released. Thus, the groove form is preferred. Another form of the guide blocks 14 is a form illustrated in FIGS. 6(a) and 6(b). In this case, the air passages 14a are each not in the form of a groove, and each of them penetrates the inside of one of the guide blocks 14 from an opening made in the contacting face 14C of the guide block 14 so as to release entrained air to another surface (such as a side face 14d, or the upper or lower face 14e) of the guide block 14, which is different from any contacting face 14c. In this way, the magnetic tape MT is prevented from floating.

Figure 6A:
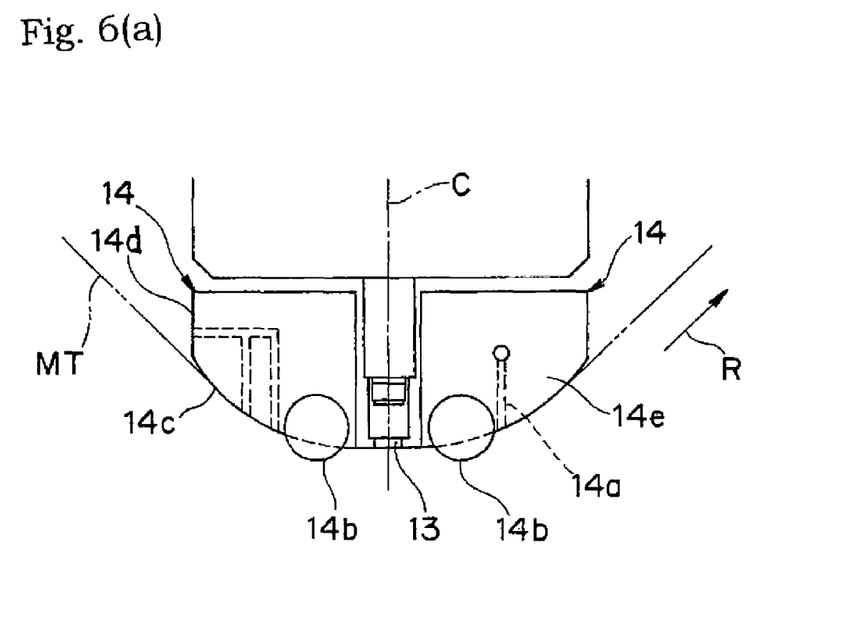
FIGS. 6(a) and 6(b) are enlarged views of a main region of an embodiment of another example of the invention.
Figure 6B:
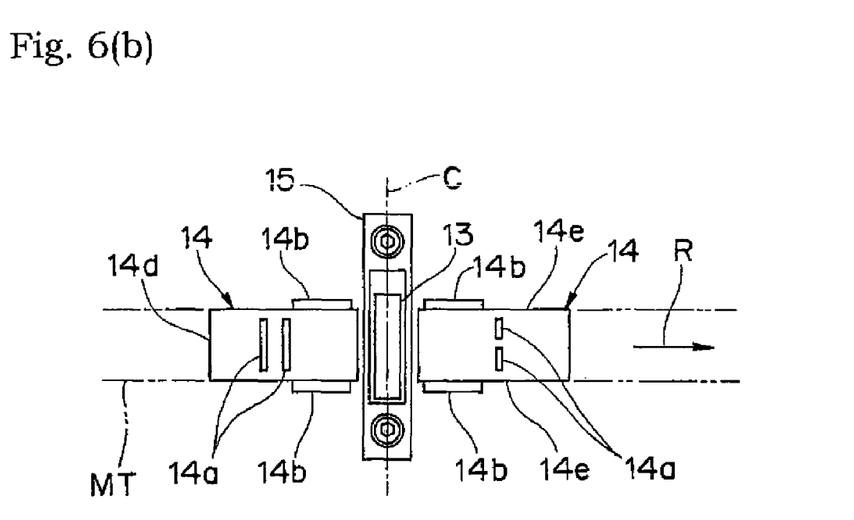

In FIGS. 6(a) and 6(b), the air passages 14a each penetrating the inside of one of the guide blocks 14 are illustrated so as to be different from each other in the upstream side guide block 14 and the downstream side guide block 14. However, this is a mere example of the air passages 14a having two different shapes. Of course, the air passages 14a may be formed to have the same shape. It is preferred that the air passages 14a are each arranged on a relatively upstream side of the contacting face of one of the guide blocks 14 with the magnetic tape MT since the magnetic tape MT is more satisfactorily adsorbed on the guide blocks 14.

A pair of flanges 14b for regulating the swing of the magnetic tape MT in the width direction thereof are fitted to each of the guide blocks 14. It is preferred that the flanges 14b are fitted to the contacting face 14c of the guide block 14 and further to the contacting region thereof with the magnetic tape MT since the swing of the magnetic tape MT in the width direction thereof can be more satisfactorily regulated. One or more of the guide blocks 14 are arranged on at least one of the upstream side and the downstream side of the magnetic head 13 in the running path of the magnetic tape MT. More preferably, the guide blocks 14 are arranged on both of the sides. When the guide blocks 14 are arranged on both of the sides, the swing of the magnetic tape MT in the width direction can be more stably decreased.

The regulating units fitted to the guide blocks 14 to regulate the swing of the magnetic tape MT in the width direction are not limited to flange-shaped units, and may have any shape as far as the units fulfill a similar function.

When one or more of the guide blocks 14 are arranged on at least one of the upstream side and the downstream side of the magnetic head 13 in the running path of the magnetic tape MT, it is preferred that the distance between the magnetic-head-side end of the flanges 14b of the guide blocks 14 and a center line C of the magnetic head 13 is 12 mm or less. The reason why this range is preferred is that if the distance is out of this range, insufficient is the effect of regulating the swing of the magnetic tape MT in the width direction by the guide blocks 14 so as to position the magnetic tape rightly. In a case where the guide blocks 14 are on both of the upstream side and the downstream side of the magnetic head 13 on the running path of the magnetic tape MT, the movement of the magnetic tape MT on the magnetic head 13 is effectively regulated in the width direction by making the following distance $d_G$ as short as 25 mm or less: the distance $d_G$ between the downstream side end of the flange 14b, for regulating the magnetic tape MT, of the guide block 14 positioned at the upstream side of the magnetic head 13 and the upstream side end of the flange 14b, for regulating the magnetic tape MT, of the guide block 14 positioned at the downstream side of the magnetic head 13. As a result, the magnetic tape can be precisely positioned. This distance $d_G$ is more preferably 15 mm or less. As the distance is smaller, a more preferred result is obtained.

In the magnetic tape apparatus described in Patent Documents 1 or 2 described above, a fitting unit for fixing its magnetic head is relatively large; thus, there is a limit onto making this distance $d_G$ small. For this reason, the magnetic head 13 used in the present apparatus makes it possible to make its fitting unit 15 small to change the width of the fitting unit 15 from, for example, 30 mm, which is a conventional width, to a small value of 8 mm or less, thereby making the distance $d_G$ small.

Additionally, it is preferred to set the length of the flanges 14b, for regulating the magnetic tape MT, in the running direction of the magnetic tape MT to 3 mm or more and 10 mm or less. The reason why this range is preferred is that if the distance is out of this range, the regulating effect may become insufficient or the flanges 14b may injure the edges of the magnetic tape MT. Furthermore, by rendering the material of the flanges 14b a ceramic, the edges of the magnetic tape MT are less damaged or the flanges 14b are less abraded so that the durability can be improved. About the flanges 14b, one or more of the flanges 14b may be arranged on each of the upstream and downstream sides of the magnetic head 13 on the running path of the magnetic tape MT.

EXAMPLES

The invention will be described in detail by way of the following examples.

The servo writer illustrated in FIG. 1 was used to cause a magnetic tape MT to run under various conditions described in Table 1, and the swing of the magnetic tape MT in the width direction and the edge damage thereof were measured and then the conditions were evaluated. The magnetic tape MT used for the evaluation was a magnetic tape wherein a nonmagnetic undercoat layer and a magnetic layer formed were successively formed on one of two surfaces of a flexible support and a back coat layer was formed on the other surface. The servo writer illustrated in FIG. 1 was used to write a servo signal on the surface on which data signals were to be recorded (magnetic layer surface).

<Swing in the Width Direction>

A transmission type optical sensor for detecting the position in the width direction of the upper edge of the magnetic tape MT was set up at a measurement position between the magnetic head 13 and the fixed guide unit 14 on the upstream side of the magnetic head 13, and the position of the upper edge of the magnetic tape MT was detected while the tape was running, thereby measuring the swing of the magnetic tape MT in the width direction. The magnetic tape MT was caused to run at a predetermined rate (5 m/s) for 1 minute, and the difference between the maximum value and the minimum value (peak to peak) in the swing waveform (100 K samples/second) obtained every 0.5 second was calculated over 1 minute. The differences were averaged, and the resultant average value was defined as the swing amount in the width direction.

<Edge Damage>

A side face of the edge of the magnetic tape after each of the servo signals was written was observed with a 500-power optical microscope. It was compared with the edge before the signal was written. The results are shown in Table 1. In the Table, symbols about the edge damage, ○, Δ and x represent a case where the edge was hardly varied before and after the signal was written, a case where the magnetic layer or the back layer was slightly shaven, and a case where the magnetic layer or the back layer was considerably shaven and scratches in the base film were also observed, respectively.

TABLE 1

|  | Example 1 | Example 2 | Example 3 | Example 4 | Example 5 | Comparative Example 1 |
| --- | --- | --- | --- | --- | --- | --- |
| Air passages in guide blocks | Made | Made | Made | Made | Made | Not made |
| Positions of the guide blocks | Upstream side + downstream side | Upstream side + downstream side | Upstream side + downstream side | Upstream side + downstream side | Upstream side + downstream side | Upstream side + downstream side |
| $d_G$ (mm) | 10 | 25 | 25 | 25 | 40 | 25 |
| Regulating unit length $d_F$ (mm) | 5 | 5 | 2 | 12 | 5 | 5 |
| Swing (μm) in the width direction | 2.1 | 3.0 | 3.8 | 3.0 | 4.4 | 5.0 |
| Edge damage | ○ | ○ | Δ | Δ | ○ | ○ |

As is shown in Table 1 described above, it is understood that the swing of the magnetic tape in the width direction is very small so that the running of the magnetic tape is very stable. Moreover, the edge damage is also small. Thus, according to the invention, it is possible to provide a servo writer capable of writing a precise servo signal, the distance thereof from a reference edge is not varied, a magnetic tape drive wherein reading errors due to deviation from a track are not generated, and other magnetic tape apparatuses.

The invention is not limited to the present example. For example, a servo signal may be written on the back coat side. In order to exclude entrained air more positively, air suction may be performed.

The invention claimed is:

1. A magnetic tape apparatus, comprising:
   a feeding unit for feeding a magnetic tape;
   a winding unit for winding up the magnetic tape;
   a magnetic head arranged on the downstream side of the feeding unit and on the upstream side of the winding unit in a running path from the feeding unit to the winding unit, the magnetic tape contacting the magnetic head when the tape runs;
   a fixed guide unit arranged on at least one of the upstream side and the downstream side of the magnetic head in a running direction of the magnetic tape running on the running path so as to be adjacent to the magnetic head, and contacting the magnetic tape to guide the magnetic tape into the running path; and
   a regulating unit for regulating the running of the magnetic tape in the width direction of the tape, the regulating unit being fitted to the fixed guide unit, characterized in that,
   a contacting face of the fixed guide unit, which contacts the magnetic tape, is equipped with an air passage which is a space for excluding entrained air lying between the running magnetic tape and the contacting face so as to generate a negative pressure.

2. The magnetic tape apparatus according to claim 1, characterized in that the air passage is disposed along the contacting face, and the air entrained by the magnetic tape is excluded through the air passage.

3. The magnetic tape apparatus according to claim 1, characterized in that the air passage of the fixed guide unit is in the form of a groove.

4. The magnetic tape apparatus according to claim 1, characterized in that the air passage is disposed to penetrate from the contacting face of the fixed guide unit through the inside of the fixed guide unit, and the air entrained by the magnetic tape is excluded through the air passage.

5. The magnetic tape apparatus according to claim 1, characterized in that the fixed guide unit is arranged on each of the upstream side and the downstream side of the magnetic head in the running direction of the magnetic tape.

6. The magnetic tape apparatus according to claim 5, characterized in that on the running path of the magnetic tape, the distance between the downstream side end of the regulating unit fitted to the fixed guide unit on the upstream side of the magnetic head and the upstream side end of the regulating unit fitted to the fixed guide unit on the downstream side of the magnetic head is 25 mm or less.

7. The magnetic tape apparatus according to claim 5 or 6, characterized in that the length of the regulating unit in the magnetic tape running direction is 3 mm or more and 10 mm or less.

8. The magnetic tape apparatus according to claim 1, characterized in that the material of the regulating unit is a ceramic.

9. The magnetic tape apparatus according to claim 1, characterized in that the magnetic tape apparatus is a servo writer.

10. A process for producing a magnetic tape, characterized in that a servo signal is written by means of the magnetic tape apparatus as recited in claim 9.

\* \* \* \* \*